(12) United States Patent
Lin (10) Patent No.: US 7,404,754 B1
(45) Date of Patent: Jul. 29, 2008

(54) CNC TUNGSTEN STEEL CUTTING MACHINE

(75) Inventor: Ching-Huang Lin, Taipei Hsien (TW)

(73) Assignee: Chia Lern Co., Ltd., Wugu Township, Taipei County (TW)

( * ) Notice: Subject to any disclaimer, the term of this patent is extended or adjusted under 35 U.S.C. 154(b) by 0 days.

(21) Appl. No.: 11/807,613

(22) Filed: May 31, 2007

(51) Int. Cl.
*B24B 49/00* (2006.01)

(52) U.S. Cl. .................. 451/5; 451/6; 451/10; 451/11; 451/21; 451/241

(58) Field of Classification Search ............. 451/5, 451/6, 9, 10, 11, 21, 178, 241, 450
See application file for complete search history.

(56) References Cited

U.S. PATENT DOCUMENTS

| | | | | |
|---|---|---|---|---|
| 3,837,122 A | * | 9/1974 | Ferguson | 451/160 |
| 3,953,945 A | * | 5/1976 | Dahlin | 451/452 |
| 4,550,532 A | * | 11/1985 | Fletcher et al. | 451/5 |
| 5,449,312 A | * | 9/1995 | Lisec | 451/5 |
| 6,244,928 B1 | * | 6/2001 | Hiramoto | 451/5 |
| 6,367,302 B1 | * | 4/2002 | Park | 72/294 |

* cited by examiner

*Primary Examiner*—Eileen P. Morgan (57) ABSTRACT

A CNC tungsten steel cutting machine suitably used to cut a metal material, such as tungsten carbide steel, includes an operational platform, a cutting mechanism, a feeding mechanism, a delivering mechanism, and a control panel. When a metal material to be cut is received in a feeding tray of the feeding mechanism, lifting control rods of the feeding mechanism lift the metal material until the metal material is temporarily positioned. Once the latest metal material is completely cut, the lifting control rods push the next metal material, so that the next metal material moves into the V-shaped guiding groove. Then, the delivering mechanism delivers the metal material forward until the metal material is located at a press location of the V-shaped guiding groove. After this, the metal material is cut by a grinding wheel of the cutting mechanism, and then dropped into a collection device adjacent to the operational platform.

1 Claim, 10 Drawing Sheets

CNC TUNGSTEN STEEL CUTTING MACHINE

FIELD OF THE INVENTION

The present invention relates to a CNC tungsten steel cutting machine for cutting a metal material, and more particularly to a CNC tungsten steel cutting machine for cutting tungsten carbide steel.

BACKGROUND OF THE INVENTION

Generally, a conventional cutting machine is provided with a fixture for manually positioning a metal material to be cut, and then the metal material can be manually cut by hand. However, the manually cutting process is not economical in consideration of manpower and time, while the operation efficiency thereof is relatively low. Meanwhile, after cutting, the metal material only has an imprecise size, so that it is necessary to further process the cut metal material to reduce the size imprecision resulting in substantially increasing the manufacture cost. Therefore, there is a need to improve the conventional cutting machine for solving the foregoing problems.

It is therefore tried by the inventor to develop a CNC tungsten steel cutting machine to solve the problems existing in the conventional cutting machine, as described above.

SUMMARY OF THE INVENTION

A primary object of the present invention is to provide a CNC tungsten steel cutting machine, which is used to cut a metal material, especially tungsten carbide steel.

To achieve above object, the present invention provides a CNC tungsten steel cutting machine suitably used to cut a metal material, such as tungsten carbide steel. The machine includes an operational platform, a cutting mechanism, a feeding mechanism, a delivering mechanism, and a control panel. When a metal material to be cut is received in a feeding tray of the feeding mechanism, lifting control rods of the feeding mechanism lift the metal material until the metal material is temporarily positioned in indentations of temporarily positioning bases of the feeding mechanism. Once the latest metal material in a V-shaped guiding groove of the delivering mechanism is completely cut, the lifting control rods push the next metal material, so that the next metal material is moved into the V-shaped guiding groove through a rolling platform of the delivering mechanism. Then, the delivering mechanism delivers the metal material forward until the metal material is located at a press location of the V-shaped guiding groove under positioning press rods of the cutting mechanism and pressed by the positioning press rods. After this, the metal material is cut by a grinding wheel of the cutting mechanism, and then dropped into a collection device adjacent to the operational platform. The control panel is used to set operation parameters, so as to carry out a completely automatic cutting operation without manually processing, and to provide multiple functions, such as precisely and speedily cutting, lowering the manufacture cost, and enhancing the yield.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Referring now to FIGS. 1, 2, 3 and 4, a CNC tungsten steel cutting machine according to a preferred embodiment of the present invention is illustrated. As shown, the CNC tungsten steel cutting machine can be used to cut a metal material, especially tungsten carbide steel.

Figure 5:
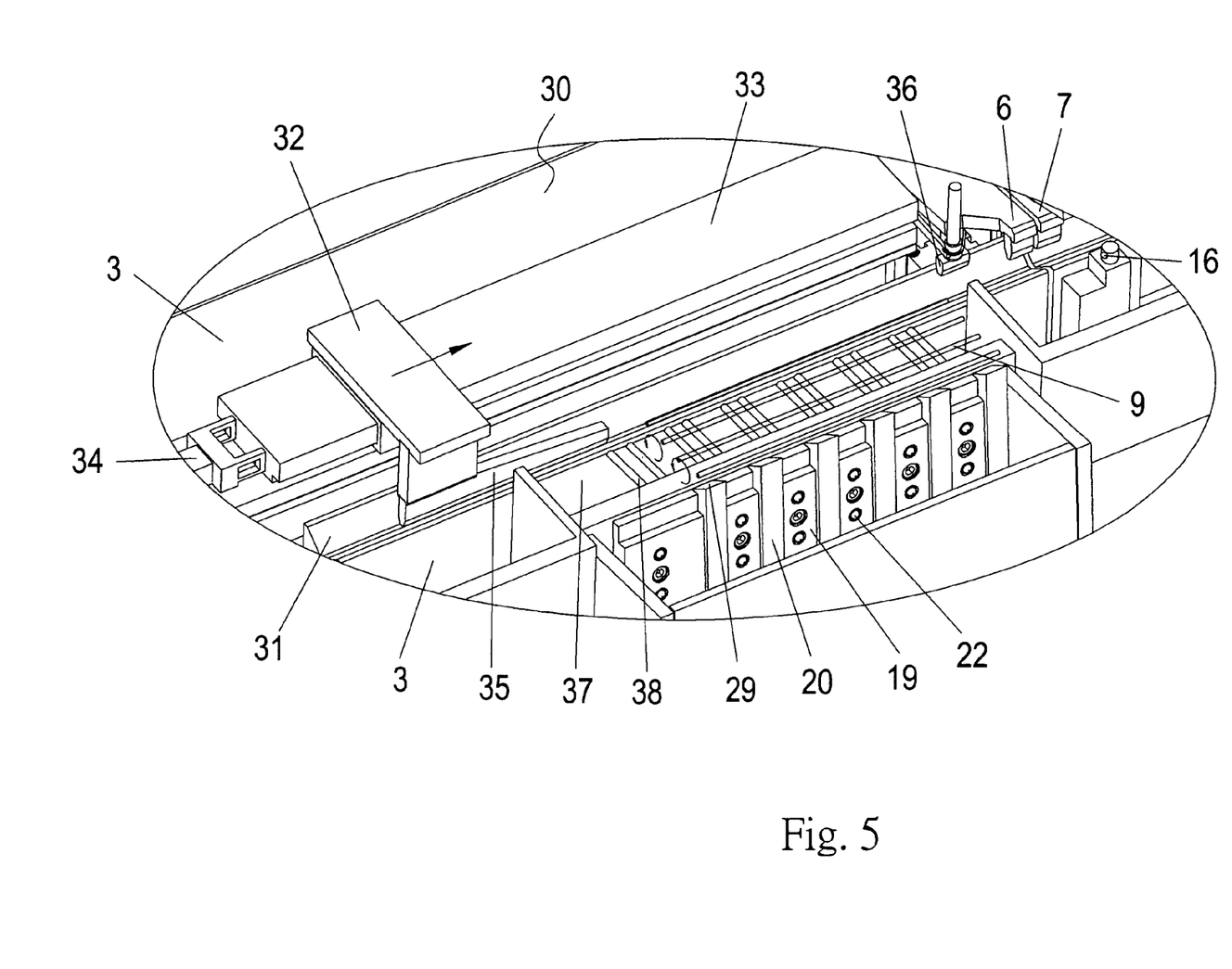
FIG. 5 is an enlarged perspective view of a delivering mechanism of the CNC tungsten steel cutting machine according to the preferred embodiment of the present invention.
Figure 6:
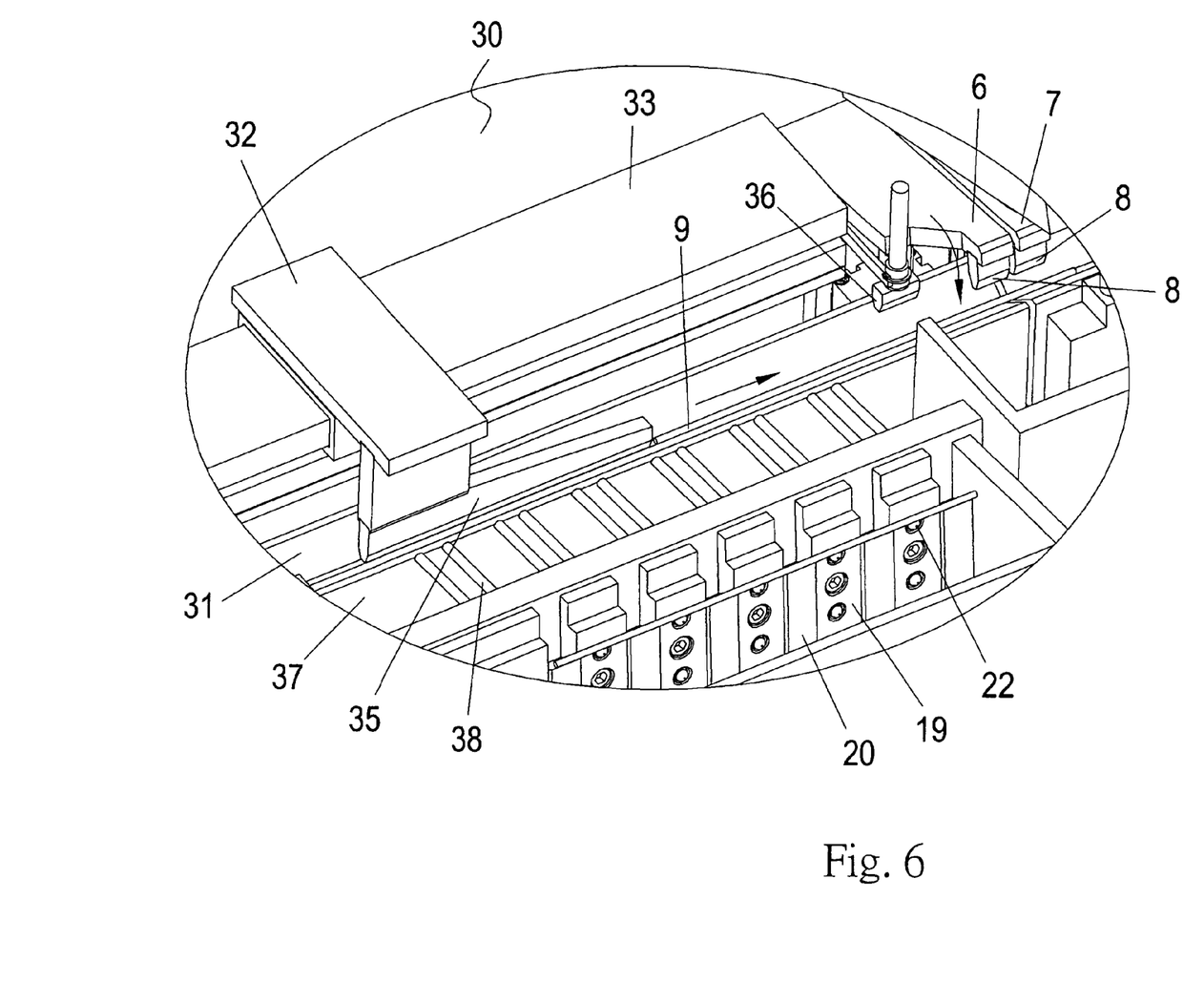
FIG. 6 is an operational view of the delivering mechanism of the CNC tungsten steel cutting machine during delivering a metal material according to the preferred embodiment of the present invention.
Figure 7:
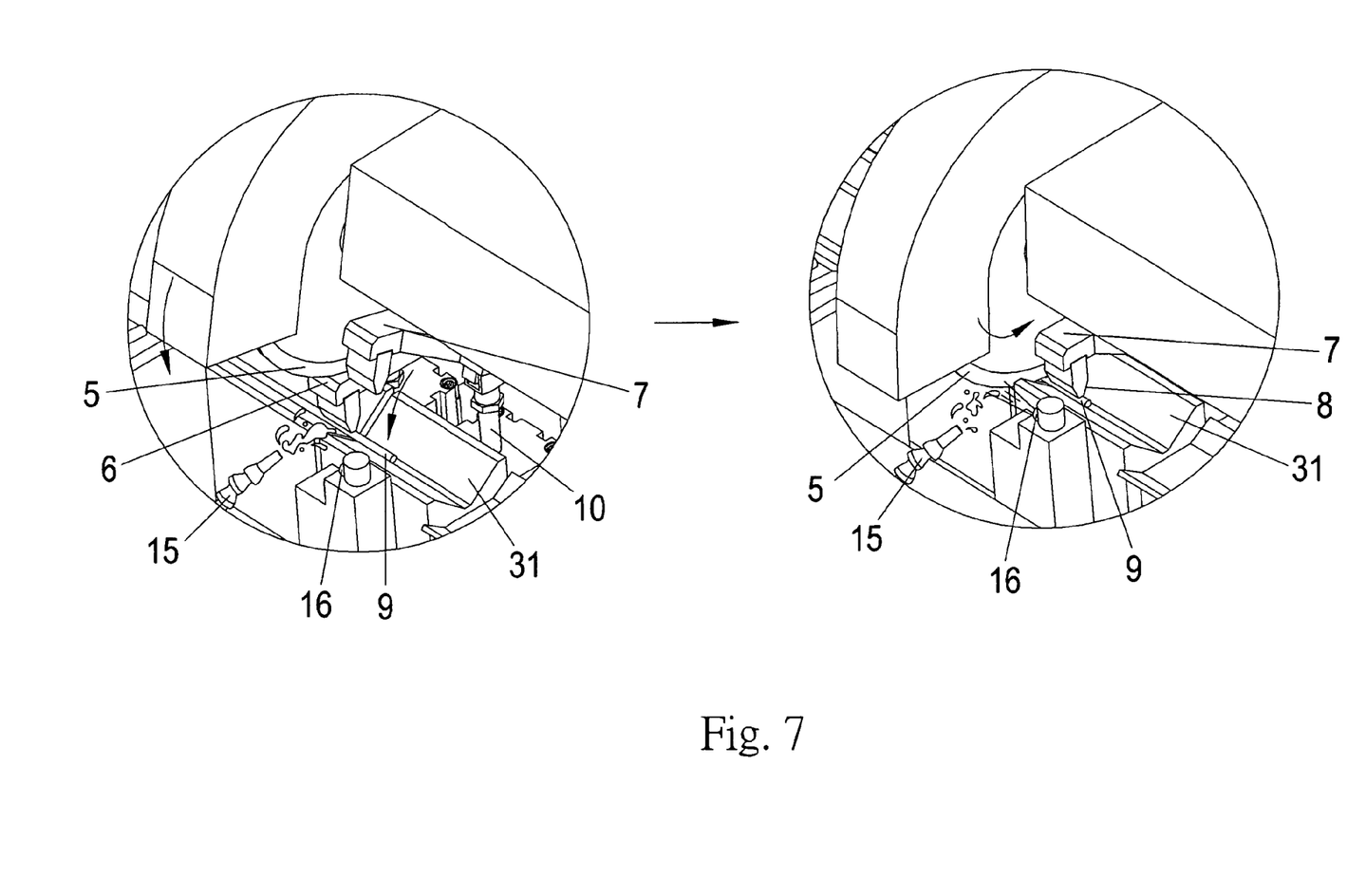
FIG. 7 is an operational view of the CNC tungsten steel cutting machine during cutting the metal material according to the preferred embodiment of the present invention.
Figure 8:
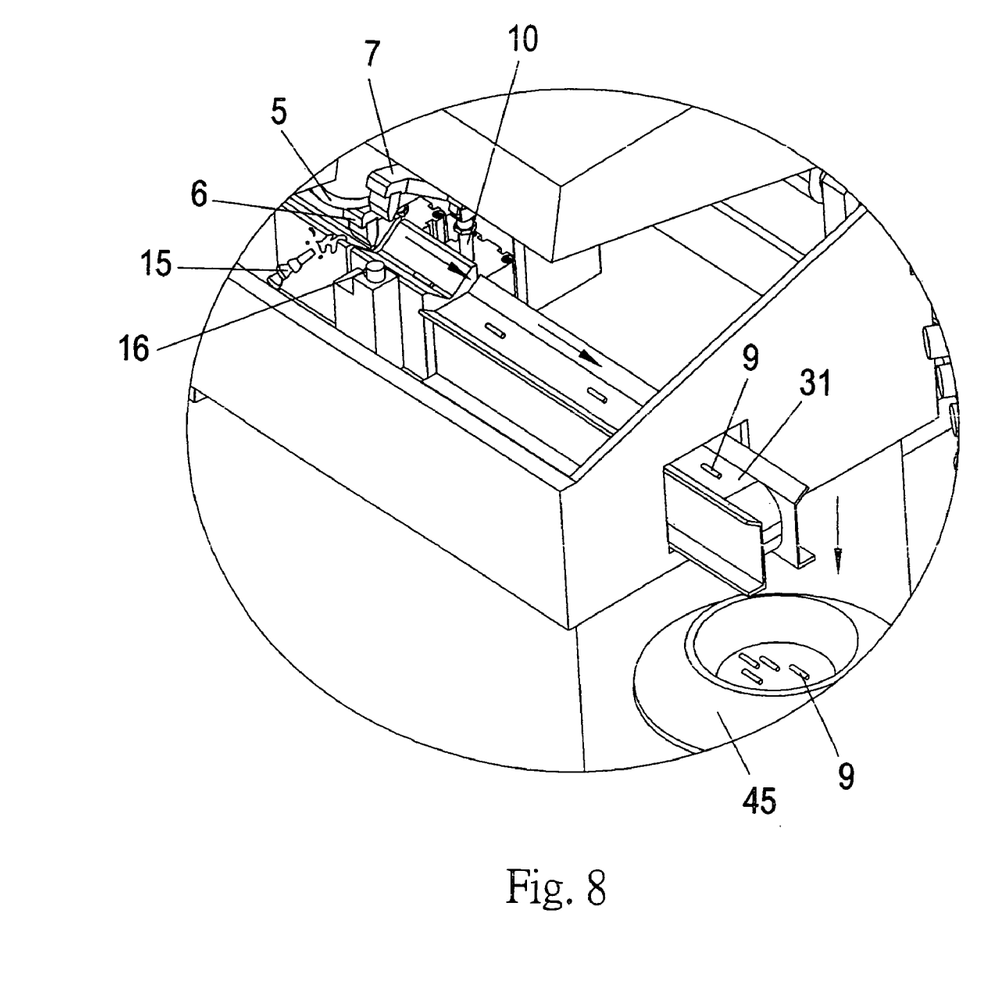
FIG. 8 is an operational view of the CNC tungsten steel cutting machine during outputting the metal material according to the preferred embodiment of the present invention.
Figure 9:
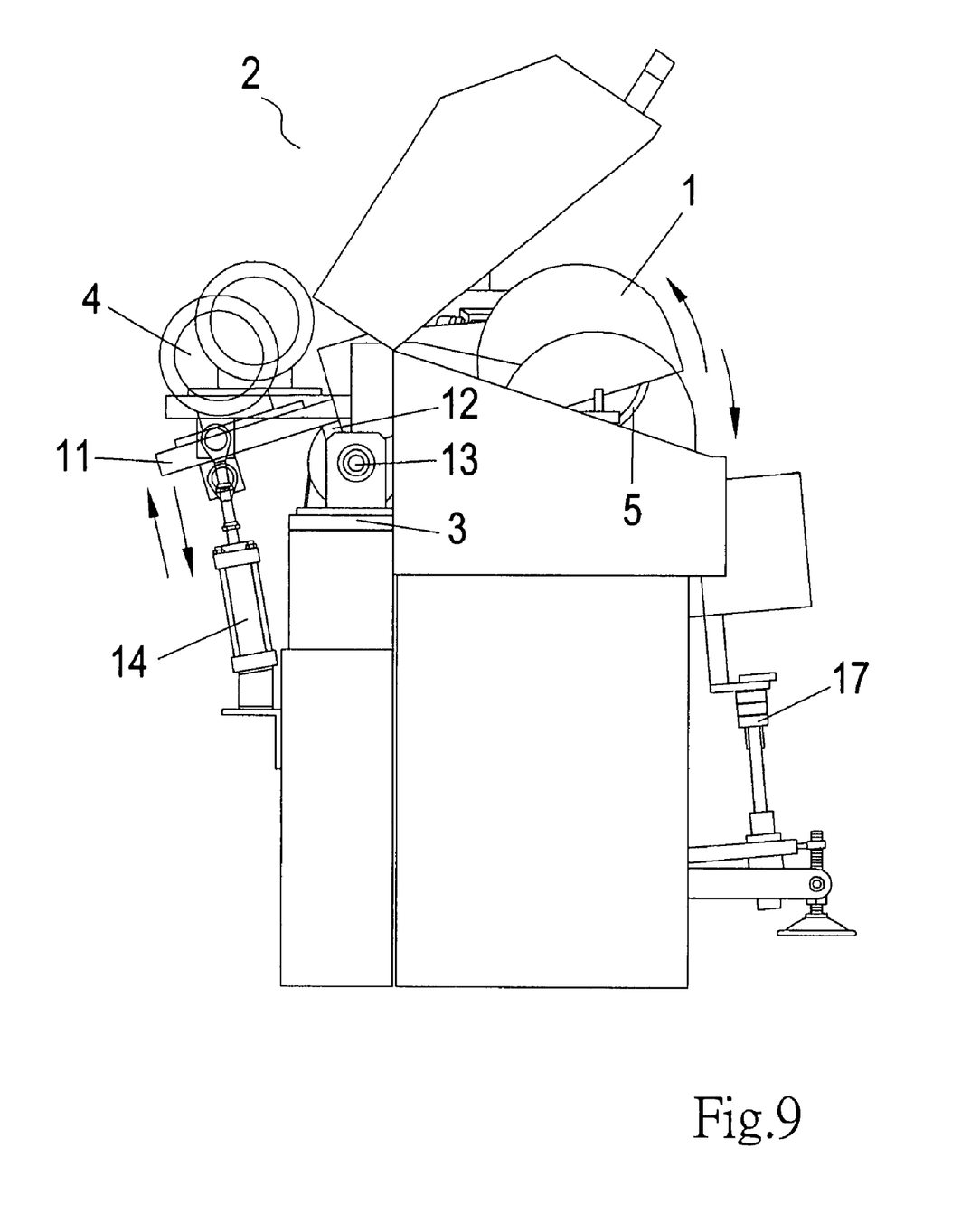
FIG. 9 is a side view of a cutting mechanism of the CNC tungsten steel cutting machine during cutting the metal material according to the preferred embodiment of the present invention.

The CNC tungsten steel machine comprises a cutting mechanism 1 mounted on an operational platform 3 of a cutting machine 2, wherein the operational platform 3 has a rear end provided with a motor 4 which is used to actuate a grinding wheel 5 mounted on a front end of the operational platform 3 for cutting, as shown in FIGS. 5, 6, 7, and 9. The grinding wheel 5 has two sides, each of which is provided with a positioning press rod 6 or 7, wherein each of the positioning press rods 6, 7 has a frond end formed with a sharp portion 8 for pressing a metal material 9 to be cut. Referring to FIGS. 7 and 8, the positioning press rods 6, 7 are actuated by a pneumatic mechanism 10. Referring to FIG. 9, the motor 4 is mounted on a base 11 with a bottom surface which has a central portion provided with a support plate 12. The support plate 12 is pivotally connected to a rear end of the operational platform 3 via a transverse shaft 13. The base 11 further has a front end mounted with the grinding wheel 5, and a rear end with a bottom surface connected to a hydraulic cylinder 14. In operation, the hydraulic cylinder 14 actuates the base 11, so that the rear end of the base 11 is lifted in relation to the transverse shaft 13, while the grinding wheel 5 on the front end of the base 11 is lowered for cutting the metal material 9. Referring to FIGS. 7 and 8, a bending pipe 15 is provided in front of the grinding wheel 5, so as to suitably spray a coolant for cooling the grinding wheel 5. Furthermore, an infrared sensor 16 is mounted adjacent to the bending pipe 15, and used to detect an abrasion consumption of the grinding wheel 5, as shown in FIGS. 5 and 7. When the abrasion consumption of the grinding wheel 5 is up to a predetermined threshold limit value, the infrared sensor 16 generates a warning signal for immediately switching off the grinding wheel 5.

Figure 1:
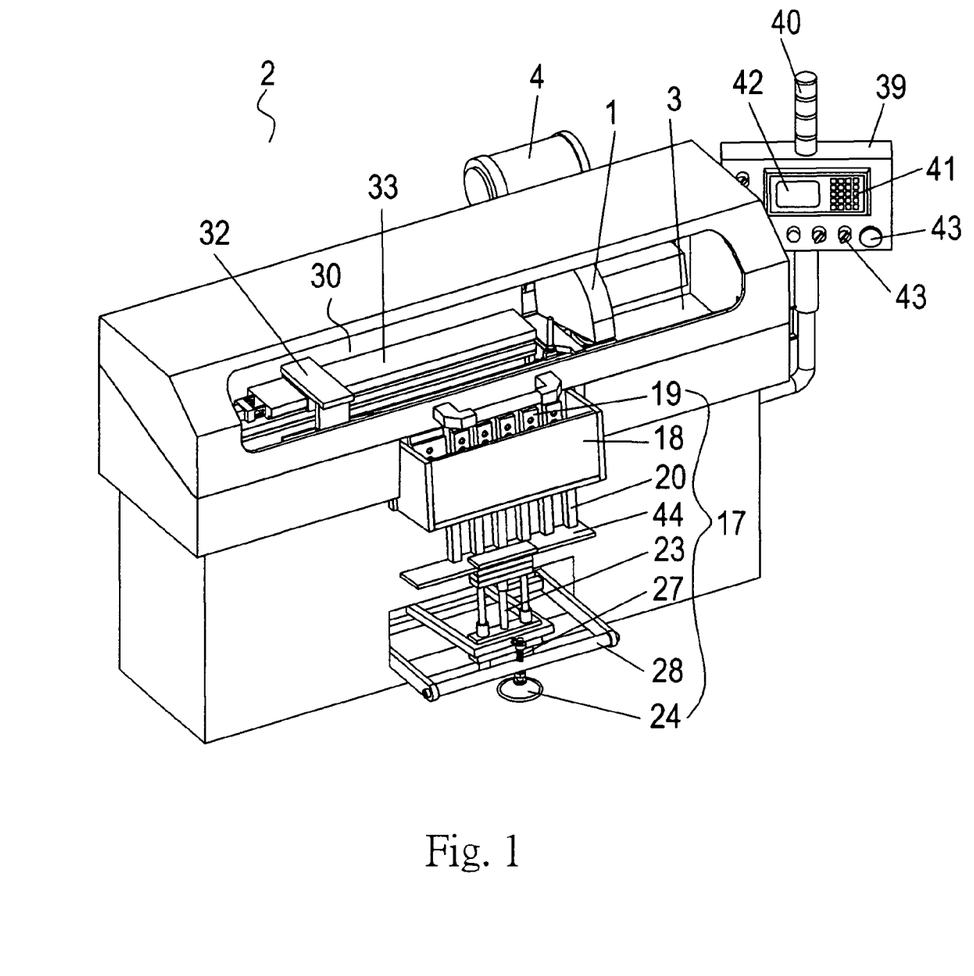
FIG. 1 is an assembled perspective view of a CNC tungsten steel cutting machine according to a preferred embodiment of the present invention.
Figure 2:
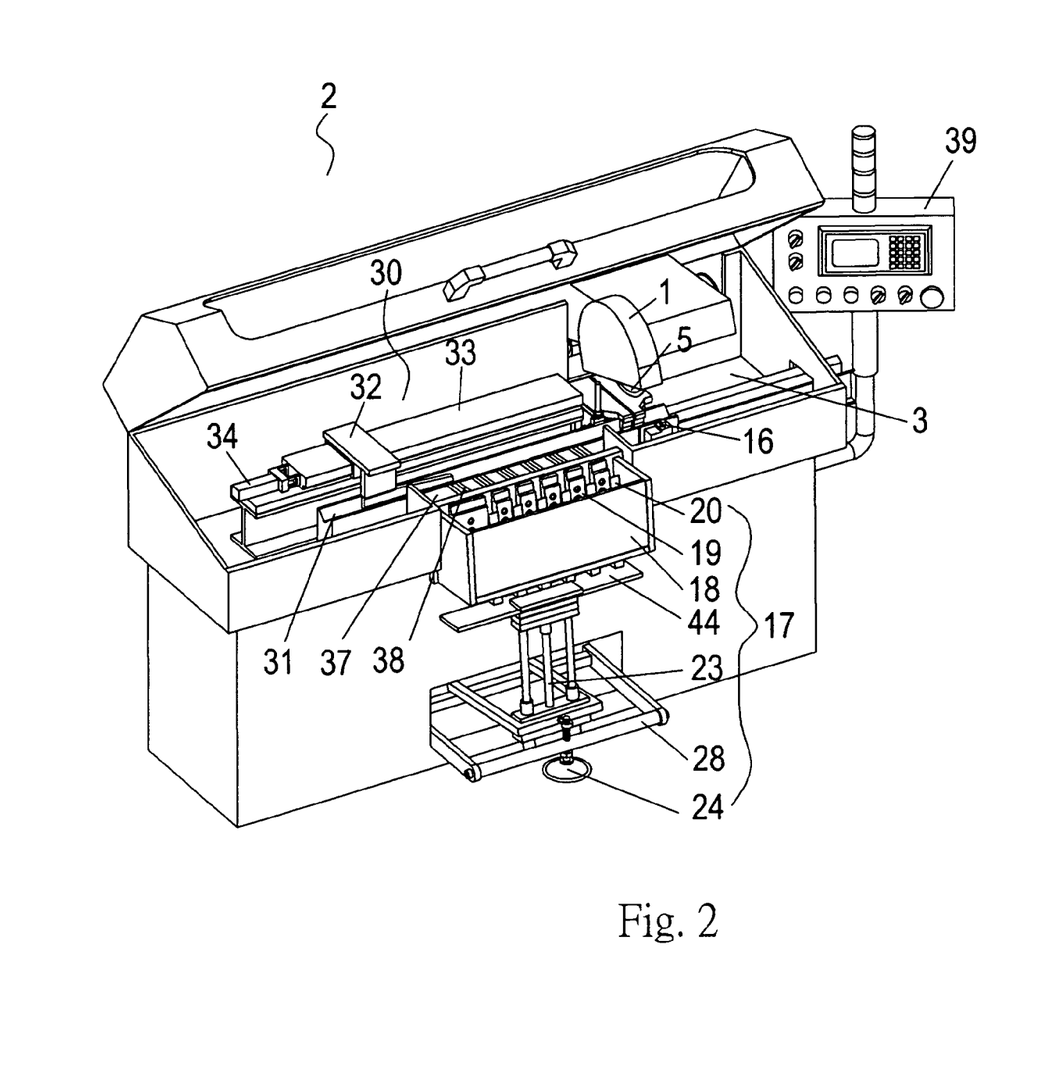
FIG. 2 is another assembled perspective view of the CNC tungsten steel cutting machine according to the preferred embodiment of the present invention, similar to FIG. 1.
Figure 3:
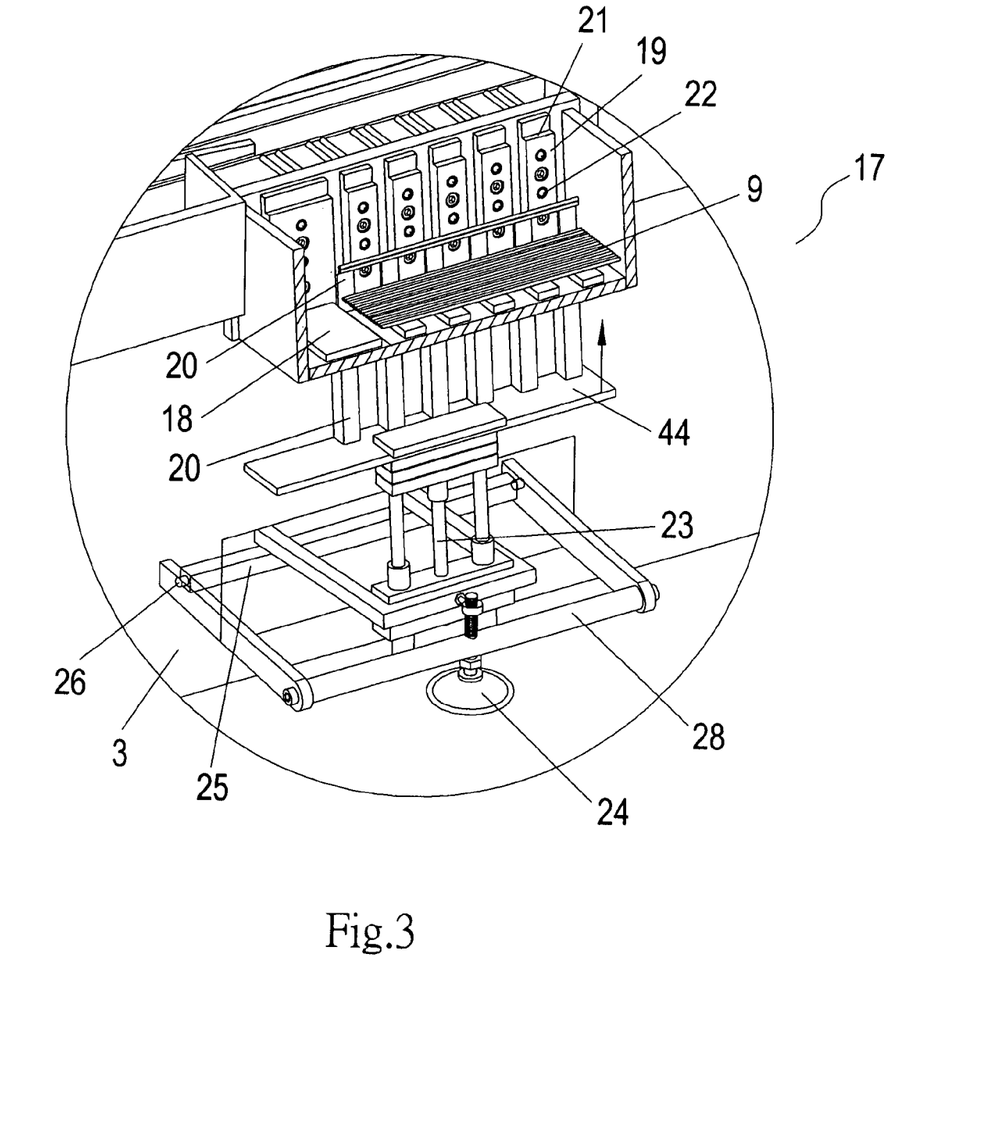
FIG. 3 is an enlarged cross-sectional view of a feeding mechanism of the CNC tungsten steel cutting machine according to the preferred embodiment of the present invention.
Figure 4:
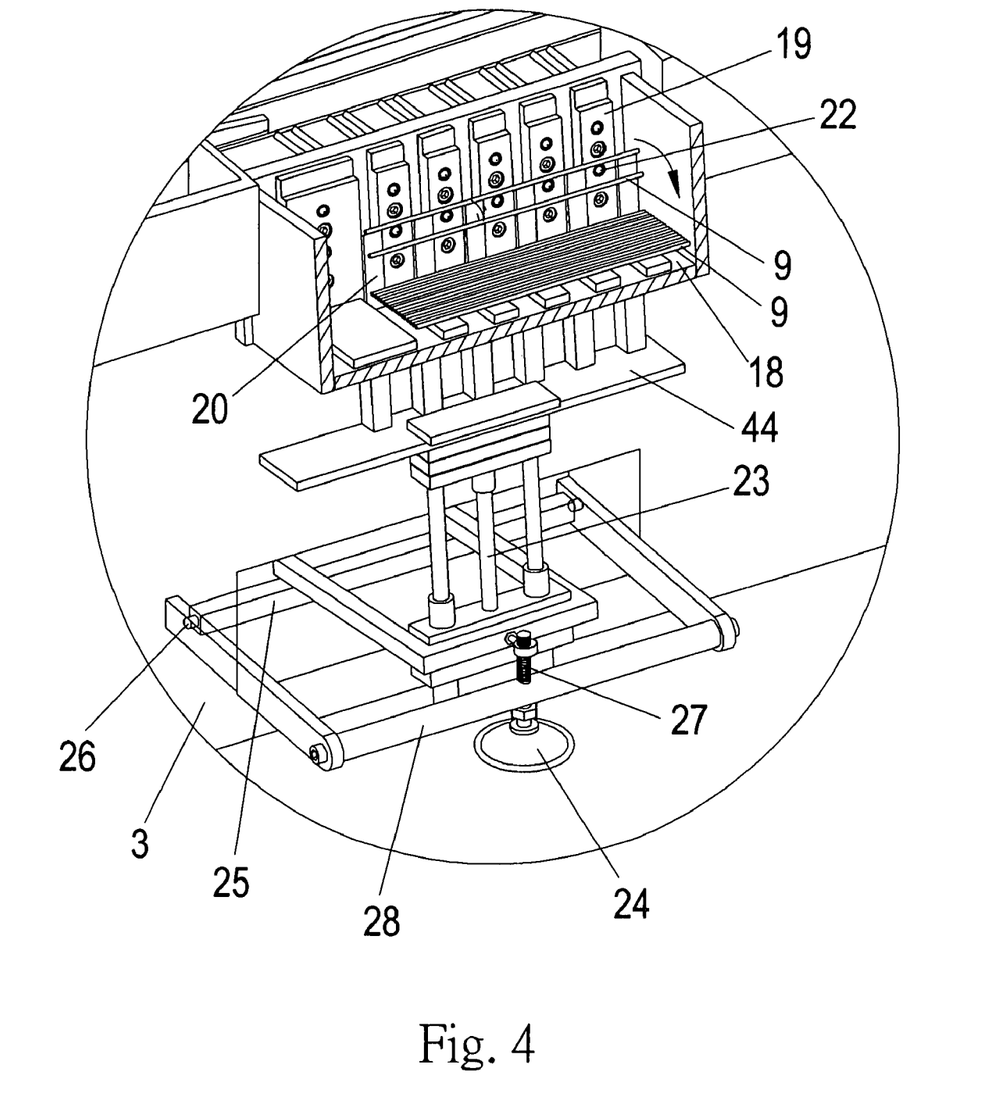
FIG. 4 is an operational view of quantitative rolling balls of the CNC tungsten steel cutting machine according to the preferred embodiment of the present invention.
Figure 10:
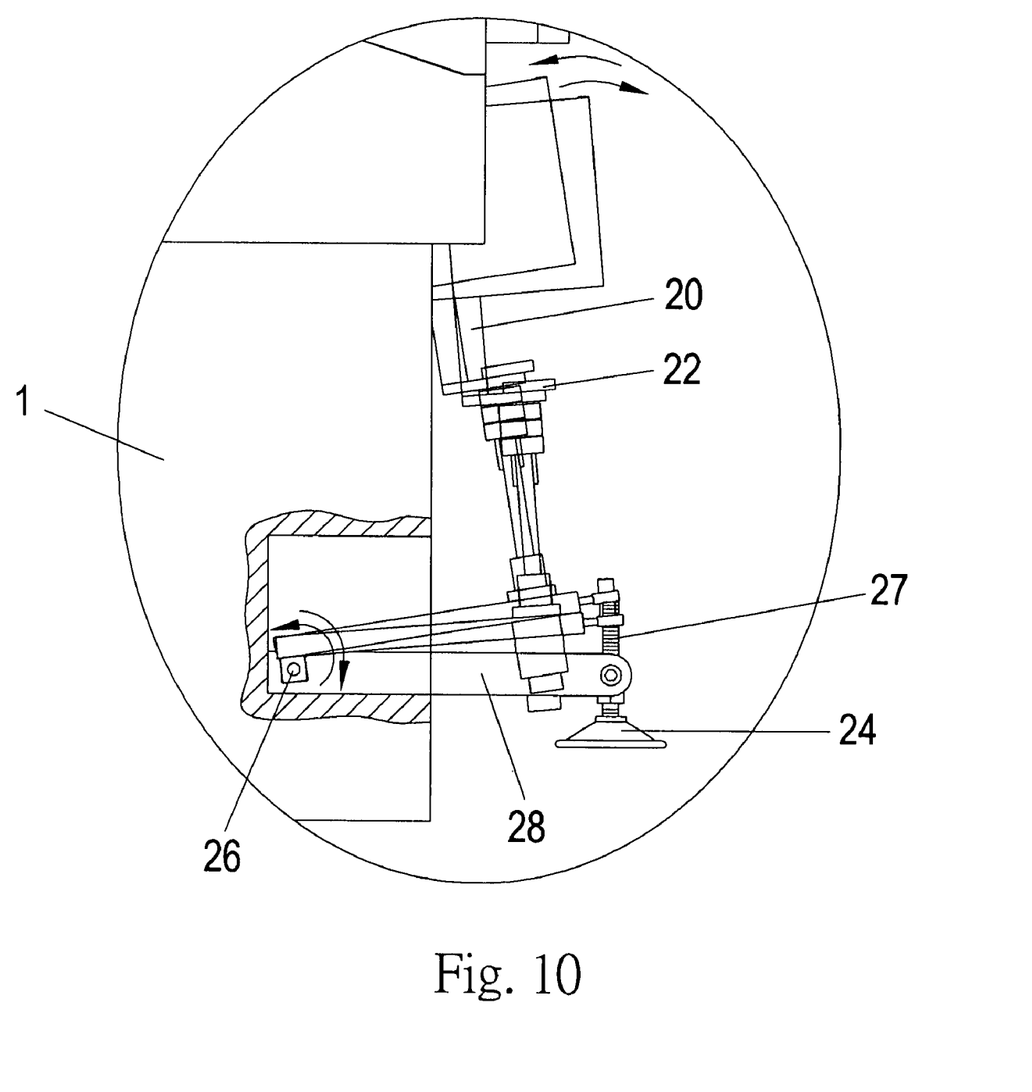
FIG. 10 is an operational view of a manually adjusting wheel of the CNC tungsten steel cutting machine according to the preferred embodiment of the present invention.

Referring back to FIGS. 1, 2, and 3, in the preferred embodiment of the present invention, the CNC tungsten steel machine further comprises a feeding mechanism 17 mounted on an upper edge of the operational platform 3, wherein the feeding mechanism 17 includes a feeding tray 18, a plurality of temporarily positioning bases 19, and a plurality of lifting control rods 20. The feeding tray 18 is used to receive the metal material 9 to be cut. The temporarily positioning bases 19 are mounted and separated from each other. Each of the lifting control rods 20 is sandwiched between each two of the adjacent temporarily positioning bases 19. Each of the temporarily positioning bases 19 is provided with an indentation 21 on an upper end thereof, wherein the indentation 21 has an outer edge and a central bottom with a height lower than that of the outer edge. Thus, in a cross-sectional view of the indentation 21, the indentation 21 is formed with an inclined surface inclined from the outer edge to the central bottom. As a result, the indentation 21 of the temporarily positioning bases 19 can be used to temporarily position the metal material 9 without any dropping risk. Moreover, each of the temporarily positioning bases 19 is provided with a plurality of quantitative rolling balls 22 on a front surface thereof, wherein the quantitative rolling balls 22 are used to control the amount of the metal material 9. In other words, when two or more than two metal materials 9 are simultaneously picked up by the quantitative rolling balls 22, the excess of the metal materials 9 will drop from the quantitative rolling balls 22 into the feeding tray 18, as shown in FIGS. 3 and 4, so that the quantitative rolling balls 22 only can pick up one of the metal materials 9 from the feeding tray 18 in each one operation. Furthermore, the lifting control rods 20 are mounted on a frame 44, and separated from each other. Each of the lifting control rods 20 is simultaneously operated between each two of the adjacent temporarily positioning bases 19. The frame 44 is provided with a plurality of pneumatic cylinders 23 and a manually adjusting wheel 24. The frame 44 is further provided with a bottom transverse rod 25 having two ends pivotally connected to a bottom portion of the operational platform 3 via a bolt 26. The manually adjusting wheel 24 includes a thread rod 27 screw-connected to a thread hole (unlabelled) of a support frame 28, and the thread rod 27 has an upper end penetrated through the thread hole and pivotally connected to the frame 44. In addition, the support frame 28 is firmly mounted on the bottom portion of the operational platform 3. When the manually adjusting wheel 24 is rotated, the manually adjusting wheel 24 will actuate the frame 44 to shift upward or downward, as shown in FIG. 10, so that a protruding height of an acting surface of each of the lifting control rods 20 in relation to the temporarily positioning bases 19 can be adjusted, in order to vary a quantitative standard of the temporarily positioning bases 19 for conveniently feeding the metal material 9. The pneumatic cylinders 23 are used to actuate the lifting control rods 20 to shift upward or downward for conveniently feeding the metal material 9. The acting surface of each of the lifting control rods 20 is substantially an inclined surface 29, so as to conveniently position and feed the metal material 9.

Referring back to FIGS. 1, 5, and 6, in the preferred embodiment of the present invention, the CNC tungsten steel machine further comprises a delivering mechanism 30 mounted on the operational platform 3 in front of the cutting mechanism 1 and the feeding mechanism 17, wherein the delivering mechanism 30 includes a V-shaped guiding groove 31 and a push rod 32. The V-shaped guiding groove 31 is mounted on the operational platform 3 for receiving the metal material 9, while the V-shaped guiding groove 31 is extended up to a location adjacent to an outputting point under the grinding wheel 5 for precisely delivering the metal material 9. The push rod 32 is mounted on a slide track assembly 33, and actuated to shift forward or backward by another motor 34, so as to conveniently deliver the metal material 9. The slide track assembly 33 is mounted adjacent to the V-shaped guiding groove 31. The push rod 32 is provided with a push plate 35 having an acting end capable of moving along the V-shaped guiding groove 31. Furthermore, the delivering mechanism 30 further includes a small press rod 36 above the V-shaped guiding groove 31 and close to the positioning press rods 6, 7, wherein the small press rod 36 is used to auxiliary press the metal material 9, so as to conveniently cut the metal material 9 by the grinding wheel 5. The delivering mechanism 30 further includes a rolling platform 37 and a plurality of recesses 38, both of which are mounted between the V-shaped guiding groove 31 and the feeding mechanism 17. The rolling platform 37 is used to convey the metal material 9 into the V-shaped guiding groove 31, and the recesses 38 are used to collect iron scraps peeled from the metal material 9.

Referring back to FIG. 1, in the preferred embodiment of the present invention, the CNC tungsten steel machine further comprises a control panel 39 mounted on a side of the operational platform 3, wherein the control panel 39 includes a warning light 40, a setting keyboard 41, a display 42, and a plurality of setting buttons 43, so that the control panel 39 can be used to conveniently display and set operational parameters for easily operating the cutting mechanism 2.

Referring back to FIGS. 1 to 10, in the preferred embodiment of the present invention, all elements as described above are used to commonly construct the whole cutting machine 2. When the metal material 9 to be cut is received in the feeding tray 18, the lifting control rods 20 lift the metal material 9 until the metal material 9 is temporarily positioned in the indentation 21 of the temporarily positioning bases 19. Once the latest metal material 9 in the V-shaped guiding groove 31 is completely cut, the lifting control rods 20 push the next metal material 9, so that the next metal material 9 is moved into the V-shaped guiding groove 31 through the rolling platform 37. Then, the delivering mechanism 30 delivers the metal material 9 forward until the metal material 9 is located at a press location of the V-shaped guiding groove 31 under the positioning press rods 6, 7 and pressed by the positioning press rods 6, 7. After this, the metal material 9 is cut by the grinding wheel 5, and then dropped into a collection device 45. The control panel 39 is used to set operation parameters, so as to carry out a completely automatic cutting operation without manually processing. As a result, the CNC tungsten steel cutting machine according to the preferred embodiment of the present invention provides multiple functions, such as precisely and speedily cutting, lowering the manufacture cost, and enhancing the yield.

Referring still to FIGS. 1 to 10, in the preferred embodiment of the present invention, the CNC tungsten steel cutting machine is suitably used to cut a metal material, especially tungsten carbide steel. Preferably, the cutting machine includes the operational platform 3, the cutting mechanism 1, the feeding mechanism 17, the delivering mechanism 30, and the control panel 39.

Referring still to FIGS. 1 to 10, in the preferred embodiment of the present invention, all elements as described above are used to commonly construct the whole cutting machine 2. When the metal material 9 to be cut is received in the feeding tray 18 of the feeding mechanism 17, the lifting control rods 20 of the feeding mechanism 17 lift the metal material 9 until the metal material 9 is temporarily positioned in the indentation 21 of the temporarily positioning bases 19 of the feeding mechanism 17. Once the latest metal material 9 in the V-shaped guiding groove 31 of the delivering mechanism 30 is completely cut, the lifting control rods 20 push the next metal material 9, so that the next metal material 9 is moved into the V-shaped guiding groove 31 through the rolling platform 37 of the delivering mechanism 30. Then, the delivering mechanism 30 delivers the metal material 9 forward until the metal material 9 is located at a press location of the V-shaped guiding groove 31 under the positioning press rods 6, 7 of the cutting mechanism 1 and pressed by the positioning press rods 6, 7. After this, the metal material 9 is cut by the grinding wheel 5 of the cutting mechanism 1, and then dropped into a collection device 45 adjacent to the operational platform 3. The control panel 39 is used to set operation parameters, so as to carry out a completely automatic cutting operation without manually processing, and to provide multiple functions, such as precisely and speedily cutting, lowering the manufacture cost, and enhancing the yield.

Compared with the conventional cutting machine, the CNC tungsten steel cutting machine according to the preferred embodiment of the present invention provides functions and advantages described more detailed as followings:

1. The CNC tungsten steel cutting machine according to the preferred embodiment of the present invention carries out the completely automatic cutting operation without manually processing.

2. The CNC tungsten steel cutting machine according to the preferred embodiment of the present invention carries out a precisely automatic cutting operation to reduce the size imprecision of the metal material to be cut.

3. The CNC tungsten steel cutting machine according to the preferred embodiment of the present invention is advantageous to save manpower and time, and lower the manufacture cost.

4. The CNC tungsten steel cutting machine according to the preferred embodiment of the present invention has the novelty and the non-obviousness in comparison with the conventional cutting machine.

5. The CNC tungsten steel cutting machine according to the preferred embodiment of the present invention has a competitive advantage in comparison with the conventional cutting machine.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A CNC tungsten steel cutting machine used to cut a metal material including tungsten carbide steel, comprising:

a cutting mechanism mounted on an operational platform of a cutting machine, wherein the operational platform has a rear end provided with a motor which actuates a grinding wheel mounted on a front end of the operational platform for cutting; the grinding wheel having two sides, each of which is provided with a positioning press rod, wherein each of the positioning press rods has a frond end formed with a sharp portion for pressing the metal material to be cut; the positioning press rods being actuated by a pneumatic mechanism, and the motor being mounted on a base with a bottom surface which has a central portion provided with a support plate, wherein the support plate is pivotally connected to a rear end of the operational platform via a transverse shaft; the base having a front end mounted with the grinding wheel, and a rear end with a bottom surface connected to a hydraulic cylinder which actuates the base, so that the rear end of the base is lifted in relation to the transverse shaft, while the grinding wheel on the front end of the base is lowered for cutting the metal material; a bending pipe being provided in front of the grinding wheel, so as to spray a coolant for cooling the grinding wheel; an infrared sensor being mounted adjacent to the bending pipe, so as to detect an abrasion consumption of the grinding wheel, wherein when the abrasion consumption of the grinding wheel is up to a predetermined threshold limit value, the infrared sensor generates a warning signal for immediately switching off the grinding wheel;

a feeding mechanism mounted on an upper edge of the operational platform, wherein the feeding mechanism includes a feeding tray, a plurality of temporarily positioning bases, and a plurality of lifting control rods; the feeding tray receiving the metal material to be cut; the temporarily positioning bases being mounted and separated from each other; each of the lifting control rods being sandwiched between each two of the adjacent temporarily positioning bases; wherein each of the temporarily positioning bases is provided with an indentation on an upper end thereof, and the indentation has an outer edge and a central bottom with a height lower than that of the outer edge, while the indentation is formed with an inclined surface inclined from the outer edge to the central bottom, so that the indentation is used to temporarily position the metal material; each of the temporarily positioning bases being provided with a plurality of quantitative rolling balls on a front surface thereof, wherein the quantitative rolling balls control the amount of the metal material; when two or more than two metal materials are simultaneously picked up by the quantitative rolling balls, the excess of the metal materials drop from the quantitative rolling balls into the feeding tray, so that the quantitative rolling balls pick up one of the metal materials from the feeding tray in each one operation; the lifting control rods being mounted on a frame and separated from each other, wherein each of the lifting control rods is simultaneously operated between each two of the adjacent temporarily positioning bases; the frame being provided with a plurality of pneumatic cylinders and a manually adjusting wheel; wherein the frame is provided with a bottom transverse rod having two ends pivotally connected to a bottom portion of the operational platform via a bolt; the manually adjusting wheel including a thread rod screw-connected to a thread hole of a support frame, wherein the thread rod has an upper end penetrated through the thread hole and pivotally connected to the frame; the support frame being firmly mounted on the bottom portion of the operational platform, when the manually adjusting wheel is rotated, the frame is actuated to shift upward or downward, so that a protruding height of an acting surface of each of the lifting control rods in relation to the temporarily positioning bases is adjusted, in order to vary a quantitative standard of the temporarily positioning bases for feeding the metal material; the pneumatic cylinders actuating the lifting control rods to shift upward or downward for feeding the metal material;

wherein the acting surface of each of the lifting control rods is substantially an inclined surface, so as to position and feed the metal material;

a delivering mechanism mounted on the operational platform in front of the cutting mechanism and the feeding mechanism, wherein the delivering mechanism includes a V-shaped guiding groove and a push rod; the V-shaped guiding groove being mounted on the operational platform for receive the metal material, while the V-shaped guiding groove is extended up to a location adjacent to an outputting point under the grinding wheel for precisely delivering the metal material; the push rod being mounted on a slide track assembly, and actuated to shift forward or backward by another motor, so as to deliver the metal material; the slide track assembly being mounted adjacent to the V-shaped guiding groove; the push rod being provided with a push plate having an acting end capable of moving along the V-shaped guiding groove; the delivering mechanism further including a small press rod above the V-shaped guiding groove and close to the positioning press rods, wherein the small press rod auxiliary presses the metal material, so as to cut the metal material by the grinding wheel; the delivering mechanism further including a rolling platform and a plurality of recesses, both of which are mounted between the V-shaped guiding groove and the feeding mechanism; the rolling platform conveying the metal material into the V-shaped guiding groove, and the recesses collecting iron scraps peeled from the metal material; and a control panel mounted on a side of the operational platform, wherein the control panel includes a warning light, a setting keyboard, a display, and a plurality of setting buttons, so that the control panel is used to display and set operational parameters for operating the cutting mechanism;

wherein the cutting mechanism, the feeding mechanism, the delivering mechanism, and the control panel commonly construct the CNC tungsten steel cutting machine, when the metal material to be cut is received in the feeding tray, the lifting control rods lift the metal material until the metal material is temporarily positioned in the indentation of the temporarily positioning bases; once the latest metal material in the V-shaped guiding groove is completely cut, the lifting control rods push the next metal material, so that the next metal material is moved into the V-shaped guiding groove through the rolling platform; and the delivering mechanism delivers the metal material forward until the metal material is located at a press location of the V-shaped guiding groove under the positioning press rods and pressed by the positioning press rods, such that the metal material is cut by the grinding wheel and dropped into a collection device, wherein the control panel is used to set operation parameters, so as to carry out a completely automatic cutting operation.

* * * * *